United States Patent
Tonn et al.

(10) Patent No.: US 10,628,533 B2
(45) Date of Patent: Apr. 21, 2020

(54) GLOBAL OPTIMIZATION OF NETWORKS OF LOCALLY FITTED OBJECTS

(71) Applicant: FARO Technologies, Inc., Lake Mary, FL (US)

(72) Inventors: Christian Tonn, Dresden (DE); Daniel Klawitter, Radebeul (DE); Oliver Bringmann, Dresden (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 396 days.

(21) Appl. No.: 15/626,380

(22) Filed: Jun. 19, 2017

(65) Prior Publication Data
US 2017/0371982 A1  Dec. 28, 2017

Related U.S. Application Data

(60) Provisional application No. 62/355,038, filed on Jun. 27, 2016.

(51) Int. Cl.
*G06F 17/50* (2006.01)

(52) U.S. Cl.
CPC .......... *G06F 17/50* (2013.01); *G06F 17/5009* (2013.01); *G06F 2217/14* (2013.01)

(58) Field of Classification Search
CPC ........................ G06F 17/5009; G06F 2217/14
USPC ............................... 703/1, 22, 2; 706/15, 16
See application file for complete search history.

(56) References Cited

U.S. PATENT DOCUMENTS

| | | | |
|---|---|---|---|
| 7,315,826 B1 * | 1/2008 | Guheen | G06Q 10/06 705/7.29ke |
| 8,504,500 B2 * | 8/2013 | Hartmann | G01B 5/28 706/15 |
| 10,361,802 B1 * | 7/2019 | Hoffberg-Borghesani | |
| 2011/0029470 A1 * | 2/2011 | Hartmann | G01B 5/20 706/16 |
| 2015/0254376 A1 | 9/2015 | Pettersson | |
| 2016/0154408 A1 * | 6/2016 | Eade | G09B 29/007 701/523 |

(Continued)

FOREIGN PATENT DOCUMENTS

WO     2014056825 A1     4/2014

OTHER PUBLICATIONS

Klawitter, D., "A Dual Quaternion Based Pipe Alignment Algorithm for Constrained Pipe Systems" 17th International Conference on Geometry and Graphics ©2016 ISGG Aug. 4-8, 2016, Beijing, China (9 pgs.).

*Primary Examiner* — Thai Q Phan
(74) *Attorney, Agent, or Firm* — Cantor Colburn LLP

(57) ABSTRACT

Aspects of the invention include global optimization of networks of locally fitted objects. An electronic representation of a network of intelligent objects is received. The network includes a plurality of intelligent objects and a plurality of gaps greater than a threshold between at least three of the intelligent objects. An aligned model of the network is created where all gaps in the aligned model of the network are less than the threshold. The creating includes optimizing a first plurality of the intelligent objects towards an axis of a second plurality of intelligent objects, and aligning the second plurality of intelligent objects towards the first plurality of intelligent objects. The optimizing and aligning are iteratively performed until a stopping condition is met. The aligned model of the network is output.

21 Claims, 9 Drawing Sheets

(56) References Cited

U.S. PATENT DOCUMENTS

2017/0337682 A1* 11/2017 Liao .......................... G06T 7/30
2018/0161986 A1*  6/2018 Kee ..................... G06K 9/00664

* cited by examiner

GLOBAL OPTIMIZATION OF NETWORKS OF LOCALLY FITTED OBJECTS

CROSS-REFERENCE TO RELATED APPLICATION

This application claims the benefit of U.S. Provisional Application No. 62/355,038, filed Jun. 27, 2016, and entitled "Global Optimization of Networks of Locally Fitted Objects", the content of which is incorporated herein by reference in its entirety.

BACKGROUND

In industrial plants there is often a high demand for precise modelling tools to create electronic representations of complex plant pipe systems. One type of surveying tool for this task is laser scanning, which may be used to measure a collection of three-dimensional (3D) coordinates for points on surfaces in the environment. After scanning and generating the measured point cloud, the electronic models of the pipe systems are created via cylinder fitting methods. The pipe joints (e.g., elbows, tees, reducers, and crosses) are usually catalogued part types. They are not typically defined by incident pipe axis angles. Indeed, they are usually produced with fixed predefined pipe axis angles (e.g. a ninety or forty-five degree elbow). The use of cylinder fitting methods to define pipe joints in this manner leads to small gaps between the joints and the fitted pipes in the resulting pipe models.

Usually, plant pipe models are made for design analysis packages, which are used for piping isometrics and simulations (e.g., fluid dynamic simulations). To use the plant pipe models in this kind of analysis, the pipe system connection points at each joint have to be collinear, or perfectly aligned, with the opposite connection point of the other pipe or joint fixture. Hence, the pipe model does not only have to be precise, but is also constrained to being contiguous (e.g. water-tight) without gaps.

To align multiple objects to each other several constraints have to be satisfied. The alignment of systems with loops may in general not be solved analytically. These kinds of problems lead to configurations in the kinematic image space that have to be manually investigated. The more complicated the problem, the more difficult it will be to find an analytic solution. Loops in the system lead to additional constraints. Therefore it is not always possible to align multiple objects using an analytical approach.

Accordingly, while existing modeling systems are suitable for their intended purpose, the need for improvement remains, particularly in providing a system for generating electronic models from a point cloud which removes gaps from between components.

SUMMARY

Embodiments of the invention include methods, systems, and computer program products for global optimization of networks of locally fitted objects. A non-limiting example method includes receiving an electronic representation of a network of intelligent objects, the network including a plurality of intelligent objects and a plurality of gaps greater than a threshold between at least three of the intelligent objects. An aligned model of the network is created where all gaps in the aligned model of the network are less than the threshold. The creating includes optimizing a first plurality of the intelligent objects towards an axis of a second plurality of intelligent objects, and aligning the second plurality of intelligent objects towards the first plurality of intelligent objects. The optimizing and aligning are iteratively performed until a stopping condition is met. The aligned model of the network is output.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The features and advantages of the invention are apparent from the following detailed description taken in conjunction with the accompanying drawings in which:

DETAILED DESCRIPTION

Embodiments are directed to performing global alignment of connection points in computer-based models that are created based on point clouds generated by three-dimensional (3D) metrology devices, such as laser scanners for example. Design packages such as Revit® and AutoCAD® Plant 3D produced by Autodesk Incorporated of San Rafael, Calif. use input models that have aligned connection points. Real world data, such as measured data obtained from laser scans, are not typically aligned. Embodiments described herein can be used to perform a global optimization of networks of locally fitted objects to generate an aligned model that can be used by design packages. Embodiments can include an alignment process for constrained pipe systems that is based on quaternion calculus. Closed cycles and fixed components can be taken into account as well as other components such as, but not limited to: tees, reducers, and elbows. Due, at least in part, to the use of a minimal displacement approach in the process, the resulting aligned model corresponds to the original point cloud.

In accordance with one or more embodiments, the minimal displacement approach includes leaving the fitted pipe axis mostly unaltered and reducing or minimizing the movement of the fittings when the alignment is performed. In addition, the orientations of the joint connection points may be collinear with each other without gaps. In one or more embodiments, it is assumed that the cylinder axes are well defined through random sample consensus (RANSAC) and least-square methods, while the other pipe parts have the potential of being insufficiently modelled. One or more embodiments of a process described herein provides for minimal movement of the fitted pipe axis, cycles in the piping system, and fixed measured tie-in points using a dual quaternion approach. One or more embodiments of the process can be utilized for auto-routing features in plant design applications.

Figure 1:
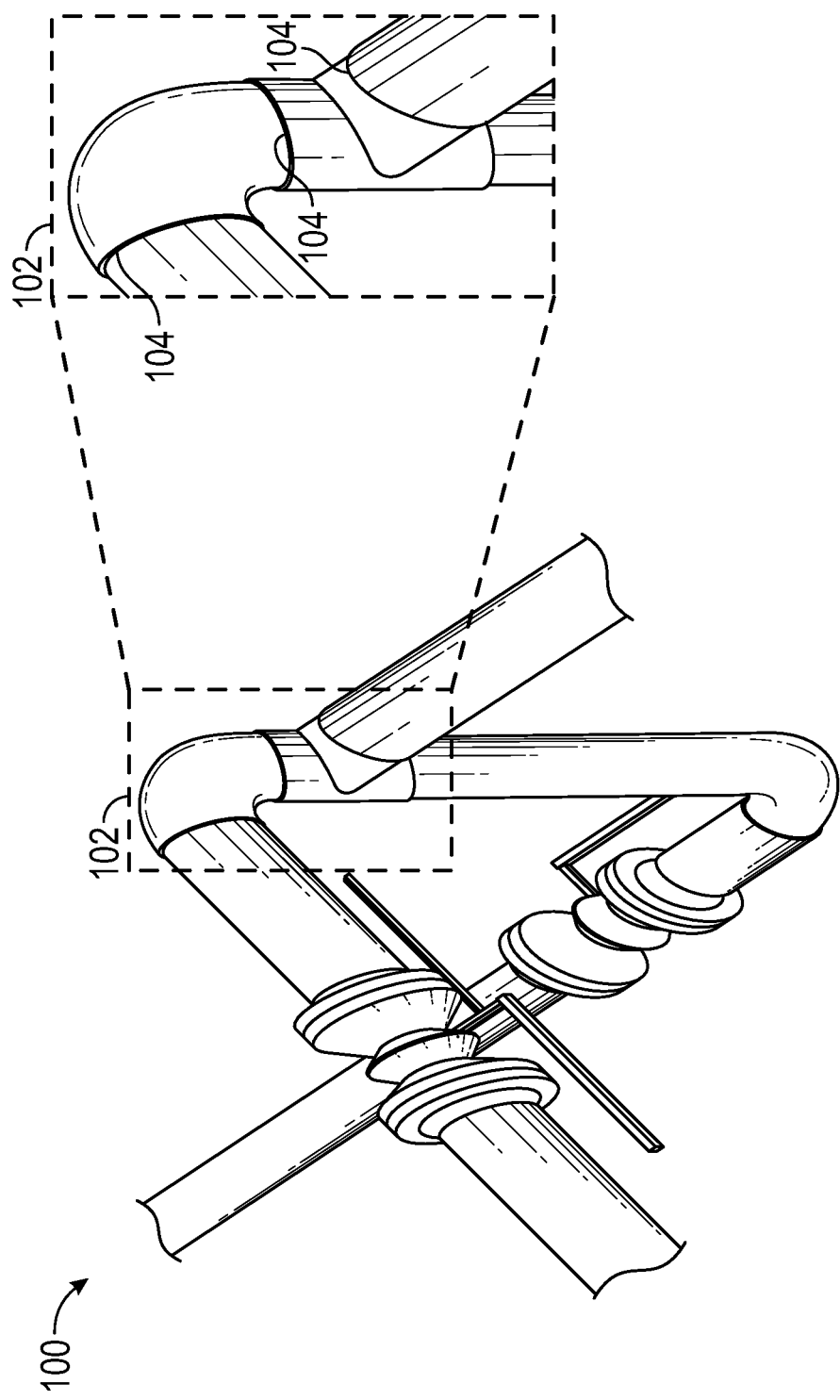
FIG. 1 depicts an example of a model of a piping system created based on point cloud generated by a metrology device, such as a laser scanner for example, in accordance with one or more embodiments.

Turning now to FIG. 1, an example of a model of a piping system 100 built based on a point cloud created by a metrology device (not shown), such as laser scanner for example, is generally shown. As used herein, the term "point cloud" refers to a collection of 3D coordinates for points on surfaces within the environment being measured. Further, it should be appreciated that while embodiments herein describe the metrology device as a laser scanner, this is for exemplary purposes and the claimed invention should not be so limited. In other embodiments, the metrology device may be any device capable of creating a set of 3D coordinates for points in the environment, such as but not limited to a laser tracker and an image scanner for example. In the illustrated embodiment, one portion 102 of the piping system 100 includes at least three connection points 104 that are not aligned to provide a contiguous joint. Embodiments described herein use the model of the piping system 100 as input and create an aligned model where the connection points are aligned and form a contiguous joint.

In accordance with one or more embodiments described herein, an iterative adaptive method that uses dual quaternion calculus is utilized to describe displacements. As discussed in more detail herein, this adaptive method may be used for forming contiguous models where joints between components within the model are aligned within a desired threshold or amount.

Dual quaternions are quaternions with dual number entries. Quaternions constitute a tool for the representation of rotations in three- and four-dimensional Euclidean cases. Furthermore, quaternions form a skew field (i.e., multiplication is not commutative). Unit quaternions are a double cover of the group SO(3). A general quaternion has the form:

$$q=a+bi+cj+dk, \ a,b,c,d \in R, \quad (1)$$

where I, j, and k are the quaternion units with $$i^2=j^2=k^2=ijk=-1. \quad (2)$$

Definition 1

Let q be a quaternion as in equation (1). Then, a is referred to herein as the scalar part and $(b;c;d)^T$ is referred to herein as the vector part. A quaternion with vanishing scalar part is referred to herein as a vectorial quaternion. Quaternions form a four-dimensional vector space over the real numbers. Addition is defined component-wise by:

$$q_1 + q_2 = (a_1 + a_2) + (b_1 + b_2)i + (c_1 + c_2)j + (d_1 + d_2)k.$$

The multiplication rules for the quaternion units in equation (2) are summarized in the following scheme:

|   | i  | j  | k  |
|---|----|----|----|
| i | −1 | k  | −j |
| j | −k | −1 | i  |
| k | j  | −i | −1 |

This scheme allows extending the concept of quaternion multiplication to general quaternions. The real numbers form the center of the quaternions (i.e., real numbers commute with all other quaternions). In addition, as described herein below, the quaternions are an example of an R-algebra.

Definition 2

The anti-involution:

$$*:H \to H, \ q=a+bi+cj+dk$$

$$: \to q^* = a-bi-cj-dk$$

is referred to herein as a quaternion conjugation. The norm of a quaternion can be defined by:

$$\|q\|=\sqrt{qq^*}=\sqrt{a^2+b^2+c^2+d^2}.$$

Every quaternion where q is not equal to 0 has an inverse quaternion that can be calculated by:

$$q^{-1} = \frac{1}{\|q\|^2}q^* = \frac{q^*}{qq^*}.$$

Unit quaternions are quaternions with norm equal to 1. With respect to quaternion multiplication, unit quaternions form a group. Every unit quaternion can be represented by:

$$q=\cos \varphi + d \sin \varphi \text{ with } d=(d_1 i + d_2 j + d_3 k),$$

where d is a unit vector and φ is in R. Moreover, unit quaternions can be used to describe rotations in 3D Euclidean space $E^3$. This can be realized with the so called sandwich operator x→qxq* where q is a unit quaternion and the coordinate vector x of a point is considered as a vectorial quaternion. The sandwich operator is applied to the standard basis vectors of R3 written as vectorial quaternions. This means the basis vectors $e_1$ belonging to the x-component is expressed by the quaternion x=i and the effect of the sandwich operator results in:

$$qiq^* = (a+bi+cj+dk)j(a-bi-cj-dk)$$
$$= (ai-b-ck+dj)j(a-bi-cj-dk)$$
$$= (a^2+b^2-c^2-d^2)i + 2(bc+ad)j + 2(bd-ac)k.$$

In the same way, the action of this operator on the vectorial quaternions j and k can be expressed as:

$$qjq^* = 2(bc-ad)i + (a^2-b^2+c^2-d^2)j + 2(cd+ab)k,$$

$$qkq^* = 2(bd+ac)i + 2(cd-ab)j + (a^2-b^2-c^2+d^2)k.$$

The sandwich operator is linear and the image of a vectorial quaternion is a vectorial quaternion again. Furthermore, the scalar product of two vectors x, y in $R^3$ is invariant under the action of the sandwich operator and it is orientation preserving. Collecting the images of the basis vectors e1, e2, e3 in a matrix A, results in:

$$A = \begin{pmatrix} a_{1,1} & 2(bc-ad) & 2(bd+ac) \\ 2(bc+ad) & a_{2,2} & 2(cd-ab) \\ 2(bd-ac) & 2(cd+ab) & a_{3,3} \end{pmatrix},$$

with $$a_{1,1} = a^2 + b^2 - c^2 - d^2,$$

$$a_{2,2} = a^2 - b^2 + c^2 - d^2,$$

$$a_{3,3} = a^2 - b^2 - c^2 + d^2,$$

This matrix is the well-known form of a rotation matrix. The components of a unit quaternion are the Euler parameters of a rotation.

Dual Numbers.

Like complex numbers, dual numbers are an extension of the real numbers. A dual number has the form $z_\varepsilon = a + \varepsilon b$, where a and b are real numbers and $\varepsilon$ is the dual unit that squares to zero, $\varepsilon^2 = 0$. Addition is defined component-wise. For two dual numbers the product is defined by:

$$(a_1 + \varepsilon b_1)(a_2 + \varepsilon b_2) = a_1 a_2 + \varepsilon(a_1 b_2 + a_2 b_1).$$

The set of dual numbers $$D := \{a + \varepsilon b | a, b \in R, \varepsilon^2 = 0\}$$

together with addition and multiplication forms a commutative ring with identity. Moreover, the dual numbers form a two-dimensional commutative unital associative algebra over the real numbers. Dual numbers with vanishing real part are zero divisors $$(\varepsilon a)(\varepsilon b) = \varepsilon^2(ab) = 0.$$

Definition 3

For a dual number $z_\varepsilon = a + \varepsilon b$, the dual number $\bar{z}_\varepsilon = a - \varepsilon b$ is called the conjugate dual number. The norm of a dual number that has no zero divisor then is:

$$\|z_\varepsilon\| := \sqrt{z_\varepsilon \bar{z}_\varepsilon} = \sqrt{(a+\varepsilon b)(a-\varepsilon b)} = |a|.$$

Any dual number without vanishing real part has an inverse dual number $$z_\varepsilon^{-1} = (a + \varepsilon b)^{-1} := \frac{1}{a^2} \bar{z}_\varepsilon.$$

Analytic functions can be extended to dual functions with the help of their formal Taylor expansion. Note that any power of E that is bigger than one vanishes. Therefore, the Taylor expansion $$f(a + \varepsilon b) = f(a) + \varepsilon b f'(a)$$

is the dual extension of the analytic function.

It is possible to calculate the inverse of a dual number by the Taylor expansion of $z_\varepsilon^{-1}$ to make the definition of the inverse dual number clear $$z_\varepsilon^{-1} = (a + \varepsilon b)^{-1} = \frac{1}{a} - \varepsilon \frac{b}{a^2} = \frac{1}{a^2}(a - cb) = \frac{1}{a^2} \bar{z}_\varepsilon.$$

Dual Vectors.

The use of dual vectors is described herein below. The n-dimensional module can be represented as:

$$D^n := \{v_\varepsilon | v_\varepsilon = v + \varepsilon \tilde{v}, \varepsilon^2 = 0, v, \tilde{v} \in R^n\}.$$

A dual vector is the sum of its real- and dual part:

$$v\varepsilon = v + \varepsilon \tilde{v}, \text{ with } v, \tilde{v} \in R^n.$$

A standard scalar product on this module can be defined by:

$$v_\varepsilon w_\varepsilon^T = (v_\varepsilon, w_\varepsilon) = (v, w) + \varepsilon((v, \tilde{w}) + (\tilde{v}, w)),$$

where $(\bullet, \bullet)$ denotes the standard scalar product of $R^n$. For the dimension n=3 the cross product can be defined by:

$$v_\varepsilon \times_\varepsilon w_\varepsilon = v \times w + \varepsilon(\tilde{v} \times w + v \times \tilde{w}), \quad (3)$$

Dual Quaternions.

Dual quaternions form a tool that can be used for the description of Euclidean kinematics in three dimensions. Quaternions with dual number components are called dual quaternions and can be denoted by:

$$H_d := \{a_0 + a_1 i + a_2 j + a_3 k + \varepsilon(c_0 + c_1 i + c_2 j + c_3 k) \mid a_0,$$

$$\ldots, a_3, c_0, \ldots, c_3 \in \mathbb{R}\}.$$

Multiplication is defined with the relations for quaternion. Furthermore, the dual unit E commutes with the quaternion units $\varepsilon i = i\varepsilon$, $\varepsilon j = j\varepsilon$, $\varepsilon k = k\varepsilon$. Dual quaternions form an eight dimensional vector space over the real numbers. The basis elements are 1, i, j, k, $\varepsilon$, $\varepsilon i$, $\varepsilon j$, $\varepsilon k$.

Displacements.

Euclidean displacements can be described by dual unit quaternions. A dual quaternion $q_\varepsilon = a_0 + a_1 i + a_2 j + a_3 k + \varepsilon (c_0 + c_1 i + c_2 j + c_3 k)$ is normed or a dual unit quaternion, if the norm is equal to one $$N(q_\varepsilon) := q_\varepsilon q_\varepsilon^* = a_0^2 + a_1^2 + a_2^2 + a_3^2 + 2\varepsilon(a_0 c_0 + a_1 c_1 + a_2 c_2 + a_3 c_3) = 1,$$

where the conjugation is the quaternion conjugation $$q^*_\varepsilon = (q_1 + \varepsilon q_2)^* = q_1^* + \varepsilon q_2^*.$$

Therefore, a dual unit quaternion satisfies two relations in the components $a_0, \ldots, c_3$ $$a_0^2 + a_1^2 + a_2^2 + a_3^2 = 1, \quad (4).$$

$$a_0 c_0 + a_1 c_1 + a_2 c_2 + a_3 c_3 = 0. \quad (5):$$

Dual unit quaternions are denoted by $U_d$ and form a group with respect to multiplication. Moreover, dual unit quaternions form a double cover of the group of Euclidean displacements SE(3). Usually, a displacement is described by the sandwich operator. Starting with a dual unit quaternion $$q = a_0 + a_1 i + a_2 j + a_3 k + \varepsilon (c_0 + c_1 i + c_2 j + c_3 k)$$

and a dual quaternion of the form $p=1+\varepsilon(xi+yj+c_2j+zk)$, representing the point $P=(x, y, z)^T$ which is in $R^3$. The sandwich operator can be applied as:

$$qpq^* =$$
$$1 + (xa_0^2 + 2za_0a_2 - 2ya_0a_3 + 2c_1a_0 + xa_1^2 + 2ya_1a_2 + 2za_1a_3 - 2c_0a_1 -$$
$$xa_2^2 + 2c_3a_2 - xa_3^2 - 2c_2a_3)\varepsilon i +$$
$$(ya_0^2 - 2za_0a_1 + 2xa_0a_3 + 2c_2a_0 - ya_1^2 + 2xa_1a_2 - 2c_3a_1 +$$
$$ya_2^2 + 2za_2a_3 - 2c_0a_2 - ya_3^2 + 2c_1a_3)\varepsilon j +$$
$$(za_0^2 + 2ya_0a_1 - 2xa_0a_2 + 2c_3a_0 - za_1^2 + 2xa_1a_3 + 2c_2a_1 -$$
$$za_2^2 + 2ya_2a_3 - 2c_1a_2 + za_3^2 - 2c_0a_3)\varepsilon k.$$

The result can be written as a product of a matrix with a vector in homogeneous coordinates:

$$\begin{pmatrix} 1 \\ x' \\ y' \\ z' \end{pmatrix} = \begin{pmatrix} 1 & 0 & 0 & 0 \\ l & a_{11} & a_{12} & a_{13} \\ m & a_{21} & a_{22} & a_{23} \\ n & a_{31} & a_{32} & a_{33} \end{pmatrix} \cdot \begin{pmatrix} 1 \\ x \\ y \\ z \end{pmatrix},$$

where $a_{11}=a_0^2+a_1^2-a_2^2-a_3^2$, $a_{12}=2a_1a_2-2a_0a_3$, $a_{13}=2a_0a_2+2a_1a_3$, $a_{23}=2a_0a_3+2a_1a_2$, $a_{22}=a_0^2-a_1^2+a_2^2-a_3^2$, $a_{23}=2a_2a_3-2a_0a_1$, $a_{33}=2a_2a_3-2a_0a_2$, $a_{32}=2a_0a_1+2a_2a_3$, $l=2c_1a_0-2c_0a_1+2c_1a_2-2c_2a_3$, $m=2c_2a_0-2c_3a_1-2c_0a_2+2c_2a_3$, $n=2c_3a_0+2c_2a_1-2c_1a_2-2c_0a_3$, This matrix vector product represents an Euclidean displacement. A parameterization of the special Euclidean group with the help of dual unit quaternions is given by $$Q = a_0 + a_1i + a_2j + a_3k + c_0\varepsilon + c_1\varepsilon i + c_2\varepsilon j + c_3\varepsilon k \quad (6)$$
$$= \cos\frac{\varphi}{2} - \sin\frac{\varphi}{2}l_0i - \sin\frac{\varphi}{2}l_1j - \sin\frac{\varphi}{2}l_2k - \frac{v}{2}\sin\frac{\varphi}{2}\varepsilon -$$
$$\left(\sin\frac{\varphi}{2}l_3 + \frac{v}{2}\cos\frac{\varphi}{2}l_0\right)\varepsilon i - \left(\sin\frac{\varphi}{2}l_0 + \frac{v}{2}\cos\frac{\varphi}{2}l_1\right)\varepsilon j - \left(\sin\frac{\varphi}{2}l_1 + \frac{v}{2}\cos\frac{\varphi}{2}l_2\right)\varepsilon k;$$

where $\varphi$ is the rotation angle and $v$ is the magnitude of a translation in the direction defined by the Plucker coordinate vector $L=(l_0:l_1:l_2:l_3:l_4:l_5)$.

Study's Sphere.

A point model for the group of Euclidean displacements is referred to as Study's sphere. Each displacement may be represented as unit dual quaternion. Note that there are two unit dual quaternions $q$ and $-q$ that describe the same Euclidean displacement. Consider a dual vector $$v\varepsilon=v+\varepsilon\tilde{v}\varepsilon D^4.$$

The canonical scalar product of this dual vector with itself results in $$(v_\varepsilon,v_\varepsilon)\varepsilon=(v,v)+2\varepsilon(v,\tilde{v}). \quad (7)$$

If the dual vector is built from a dual unit quaternion corresponding to an Euclidean displacement, the real part contains the Euler coordinates corresponding to the rotational part of the displacement, and the translational part of the displacement may be derived from the dual part. The dual part of Equation (7) vanishes, and thus, the value of the scalar product is a real number. In an embodiment, the scalar product is equal to one and the dual vector $$v_\varepsilon \text{ with } (v_\varepsilon,v_\varepsilon)\varepsilon=1$$

a normalized dual vector or dual unit vector. Therefore, the group of Euclidean displacement SE(3) with points of the dual unit sphere are identified as:

$$S_D^1:=\{x_\varepsilon\varepsilon D^4|<x_\varepsilon,x_\varepsilon>_\varepsilon=1\}.$$

This model allows an elegant way to find a mean displacement. Through the use of slerping it is possible to define great circles on Study's sphere connecting two points and to determine the point corresponding to the midpoint on this curve. The corresponding displacement can be interpreted as mean displacement. Using dual vector calculus this can be done by adding dual vectors and normalizing the result afterwards. Through repeated application of this procedure the mean displacement of multiple displacements can be computed.

Figure 2:
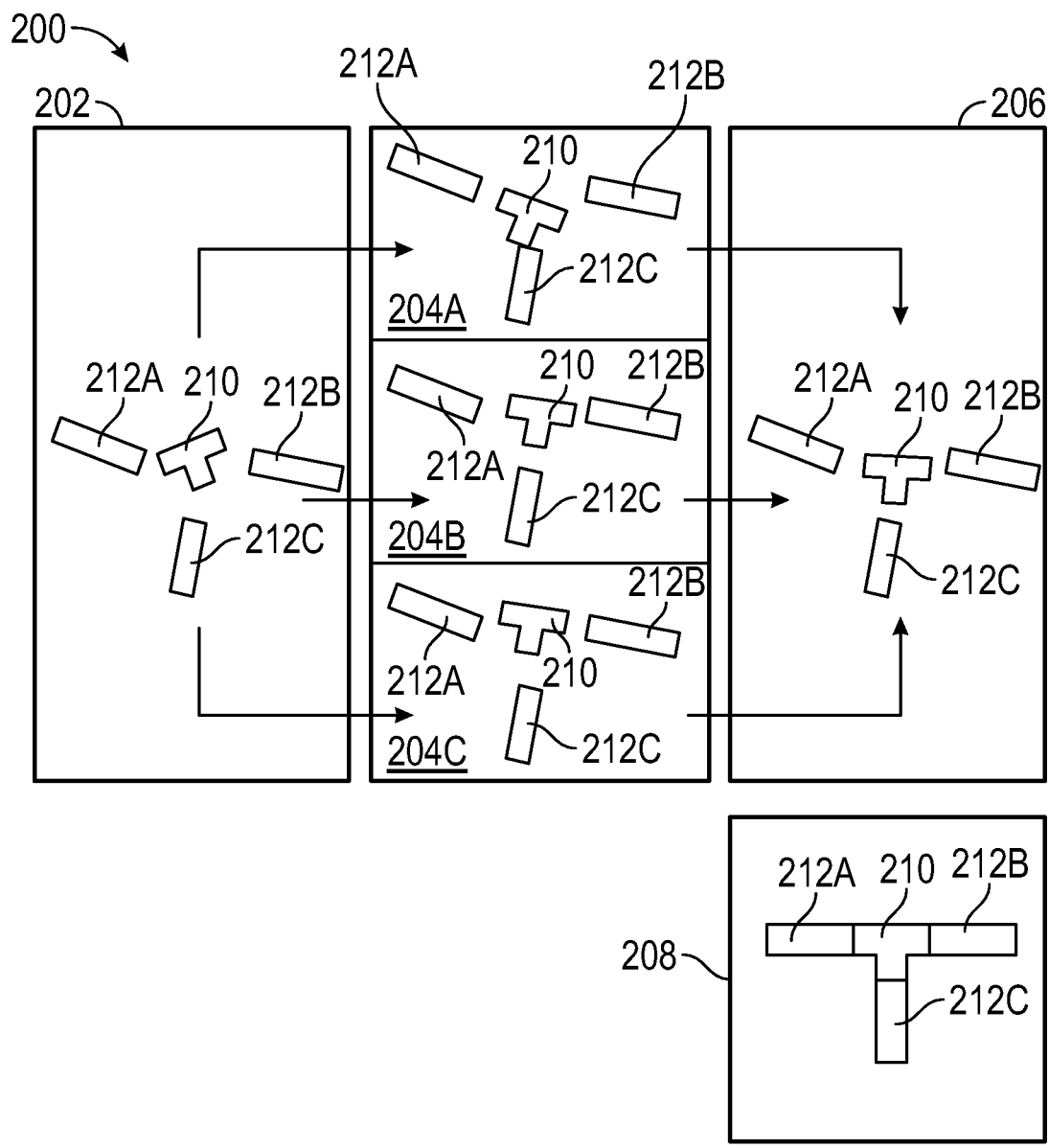
FIG. 2 depicts results of a global mean displacement process for generating an aligned model in accordance with one or more embodiments.

Turning now to FIG. 2, the stages 200 of a global mean displacement process for generating an aligned model is generally shown in accordance with one or more embodiments. A portion of a model of a piping system may be based on a point cloud generated for example, by a laser scanner, is shown in block 202 of FIG. 2. The portion of the model shown in FIG. 2 includes a tee component 210 and three pipe components, pipe 212A, pipe 212B, and pipe 212C. As shown, the components within block 202 are not contiguous or aligned. As a result, the operator performing an analysis using an application, such as computational fluid flow for example, may have difficulty obtaining the desired analytical results. At block 204A of FIG. 2, the tee component 210 is transformed to satisfy the constraint of neighboring pipe component 212A. At block 204B, the tee component 210 is transformed to satisfy the constraint of neighboring pipe component 212B, and at block 204C the constraints of neighboring pipe component 212C. Block 206 of FIG. 2 shows the result of an interim model representing the displacements of blocks 204A, 204B, and 204C as dual unit quaternions to compute the mean displacement. This process is repeated using the last interim model (e.g., model of pipe system shown in block 206 of FIG. 2) until the tee component 210 is aligned within a predetermined criterion with each of the pipe components 212A, 212B, and 212C as shown in block 208 of FIG. 2.

Figure 3:
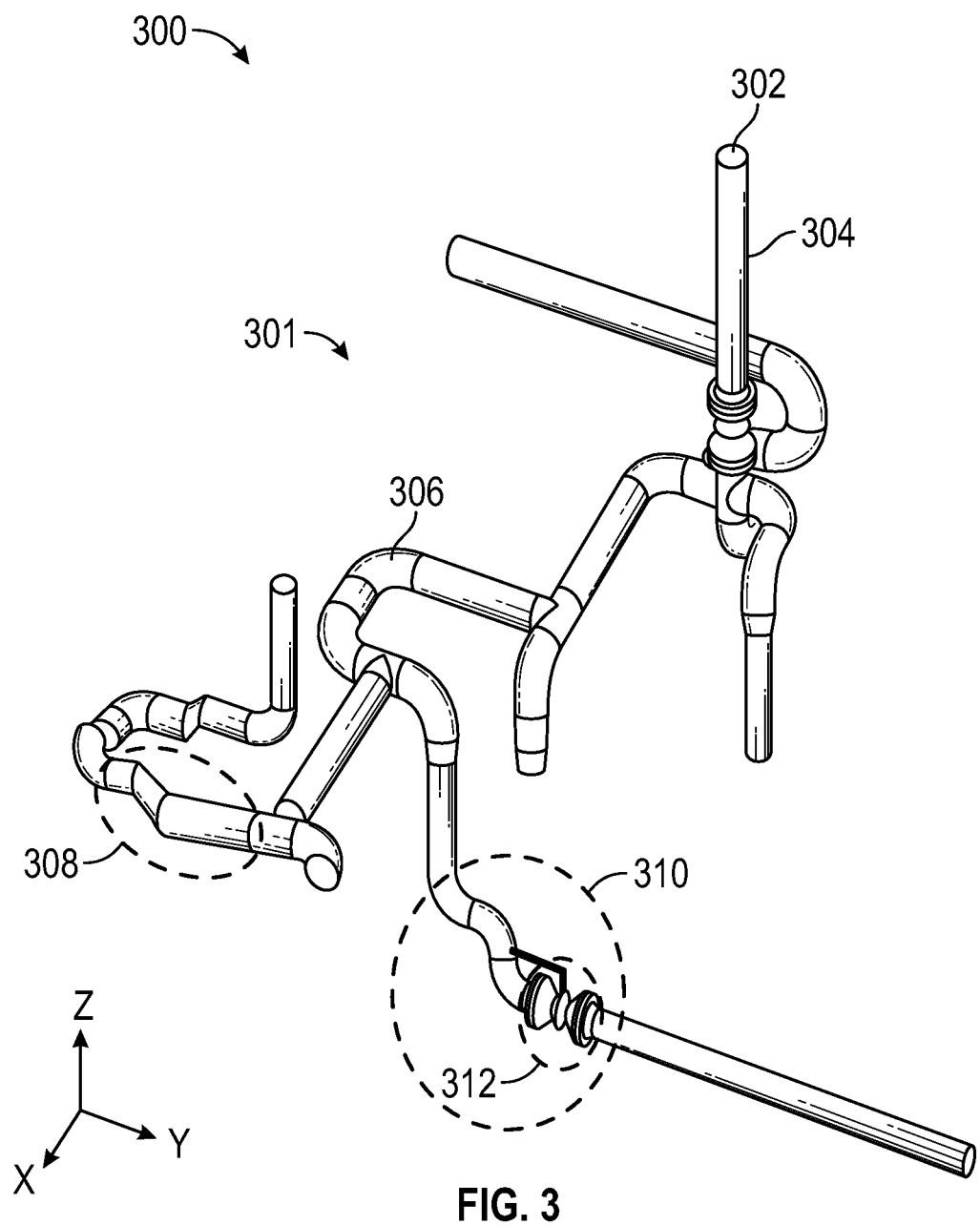
FIG. 3 depicts a model of a piping system in accordance with one or more embodiments.

Turning now to FIG. 3, a model 300 of a piping system 301 is generally shown in accordance with one or more embodiments. As shown in FIG. 3, a connection point 302 is an object containing a position (i.e., a point and normalized direction vector). This connection point 302 is attached to every pipe and pipe joint within the system 301. If two components are connected to each other then their connection points are contiguous and compatible. This means that the position is the same and the normalized direction vector has an opposite direction. Also shown in FIG. 3 is a pipe 304 which is a straight pipe with a connection point at each end that are collinear to each other. In one or more embodiments, the length of the pipe can be altered.

Still referring to FIG. 3, a fix 306 is provided that comprises a rigid set of connection points that reflect the topology of a catalogued component. These catalogued components include, but are not limited to: elbows, tee-fittings, reducers, cross-fittings and valves for example. In contrast to pipes they cannot change their shape. Fixes are components to establish connections between pipes. Also shown in FIG. 3 is a fix cluster 310 that includes a set of connected fixes and that can be is used to realize complex systems of fixes, such as a sequential set of connected elbows for example. Also shown in FIG. 3 is a fix group 312 which is a subset contained by the fix cluster 310. A fix group 312 can include multiple connected fixes that do not overlap and that are used to optimize the fix clusters. A pipe row 308 is also shown in FIG. 3 and it includes a set of components (e.g., pipes and fixes) that possess parallel or collinear connection points. Thus, the fixes contained by the pipe row 308 also have parallel or collinear connection points (e.g., reducers, ex-centric reducers, valves). In one or more embodiments described herein, the components of a pipe row are processed as one component.

Figure 4:
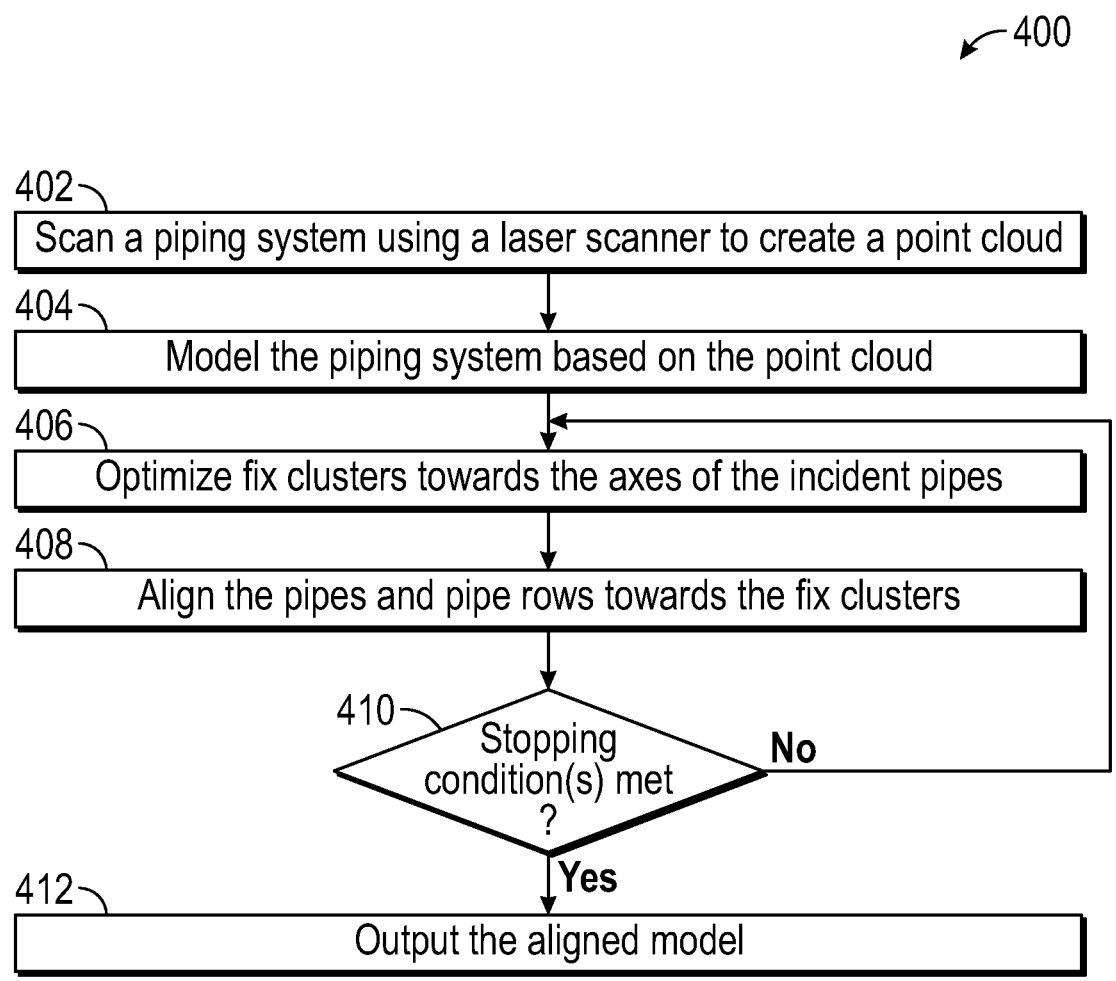
FIG. 4 depicts a flow diagram of a process for generating an aligned model in accordance with one or more embodiments.

Turning now to FIG. 4, a flow diagram of a process 400 for generating an aligned model is generally shown in accordance with one or more embodiments. At block 402, a piping system is scanned using a laser scanner to create a point cloud. It should be appreciated that the point cloud may be generated by combining or registering measurement data acquired by multiple metrology devices, or by moving a single metrology device to multiple locations. The description herein of the acquisition of the point cloud data from a single laser scanner is for exemplary purposes and not intended to be limiting. At block 404, a model of the piping system is generated based on the point cloud. In one or more embodiments, it is assumed that the pipes have been fitted to the point cloud precisely. Therefore, the pipe initial axis represents the measured position and orientation in the point cloud data. In accordance with one or more embodiments, during the computation shown in FIG. 4, access to the raw point cloud point data may not be suitable because the underlying CAD system takes too long to process the data. The resulting point cloud based model will have small gaps, or displacements, between the joints and the fitted pipes. In other words, the piping system, such as piping system 301 is not contiguous and in some embodiments would not be desirable for use with analysis applications due to the gaps or displacements. In one or more embodiments dual quaternion calculus is utilized to describe the displacement.

At block 406 of FIG. 4, the fix clusters in the model generated in block 404 are optimized towards the axes of incident pipes. In one or more embodiments, the pipe axes are left unaltered in this part of the calculation. At block 408, the pipes and the pipe rows are aligned towards the fix clusters. An iteration of performing block 406 followed by performing block 408 continues until it is determined, at block 410, that a stopping criterion or condition(s) have been met. The resulting alternating alignment, caused by iteratively performing blocks 406 and 408, converges towards an improved global result. In accordance with one or more embodiments, the process takes advantage of the fact that there is exactly one pipe or pipe row in between two fix clusters.

Once a stopping condition(s) has been met, as determined at block 410, the aligned model is output to a storage device or to a design package. Examples of stopping conditions include, but are not limited to all of the objects in the model being within an error threshold. For example, in Autodesk® AutoCAD® Plant 3D 2015, a stopping condition can include defining a default precision parameter of an epsilon $10^{-10}$ in an AutoCAD drawing unit. This precision parameter can apply to delta movement and angle deviation of the connection points. This stopping condition can be selected to avoid or prevent seeing those imperfections in the model with small images of water drops at the connection point locations. In newer versions of Autodesk AutoCAD Plant 3D the user is able to adjust those epsilon thresholds based on user requirements. For example, if the AutoCAD drawing measurement unit is "mm", the epsilon could be bigger (e.g., $10^{-7}$). This is not the software's default value however, it can vary depending on the drawing, the used drawing measurement unit and the user's desired requirements.

In one or more embodiments, the stopping conditions are driven by or defined by requirements of the target application. In one or more embodiments, the first stopping condition is the maximum deviation error at the connection points in terms of delta movement (translation) and delta angle (collinear opposite direction vectors). There can also be an "explosion" indicator, which stops and restarts the process with a changed net topology (the connection with the highest error impact is cut or reduced). In one more embodiments there is an iteration counter which stops the processing in FIG. 4 when a selected iteration count threshold is reached (e.g., 2,000 iterations or 4,000 iterations). In some embodiments, this allows the process to be stopped at some point in time and shows the result with all errors. This may provide advantages in allowing the user to identify the error sources.

In accordance with one or more embodiments, the processing of blocks 406 and 408 shown in FIG. 4 is performed while ensuring the order independence during the calculation of the piping components. In one or more embodiments this includes performing the calculation of the mean dual quaternion transformation from all separate transformations of the connection points of a component.

In accordance with one or more embodiments, the processing of blocks 406 and 408 shown in FIG. 4 includes enforcing a minimal length of the pipes. This avoids flipping or reversing of the end connection points of the pipe. In other words, the orientation/direction of the pipe remains the same. In one or more embodiments, minimum pipe length is any number larger than zero (e.g., a tenth of the pipe radius). In addition, longer pipes can be more limited in their movement than short pipes.

In accordance with one or more embodiments, the processing shown in FIG. 4 includes introducing an additional defined directional vector (e.g. "up") for collinear fixes which is re-established after each performance of blocks 406 and 408. Thus, unwanted rotations of valves around their own axes are avoided or cancelled out.

In accordance with one or more embodiments, after the calculation of the rotation and translation in each iterative step (i.e., each performance of blocks 406 and 408), it is checked whether the resulting movement of the components' connection points exceed a certain movement threshold. If the movement threshold is reached, the complete transformation is limited towards the set threshold. This way, the calculated transformation direction is preserved and the adjacent piping components are allowed to adjust themselves towards the change. Doing so can prevent the model from breaking apart (e.g. explosion of components) and the convergence may be achieved. In accordance with one or more embodiments, the processing shown in FIG. 4 includes having pipe movements that are stronger limited in their movement than the fixes using this technique. This can account for the pipe axes having been measured in the point cloud and that should be better preserved.

In accordance with one or more embodiments, to provide for high accuracy during the calculation, the calculation is performed with much more precise data type than the data that is used to save the result. In one or more embodiments, the quadruple data type is used for the calculation and double data type is used to store the result in the design system (e.g., a CAD system). To increase the accuracy and speed during the calculation of the transformations further, dual quaternions can be used. This can lead to increased speed of calculations. Trigonometric functions (e.g., sins, cosines, tangents and their arcus counterparts) are avoided this way, because they can be error prone and slow. The dual quaternions enable an efficient way to calculate mean transformations and replace the commonly used 4×4 matrices.

In one or more embodiments a user is allowed to, via a user interface, fix the position of certain pipes and fixes in the model, and to adjust the piping system afterwards to the fixed components. This provides advantages in working with components which have been located using tie-in-points. These are placed in the coordinate system and should be unaltered in terms of position and rotation after applying the processing described herein.

If there are inconsistencies in the system because of too many fixed components and the conflicts can not be resolved using the present degrees of freedom in the piping system, an automatic splitting of the piping topology and marking of the split can be applied in accordance with one or more embodiments. This splitting can done at all connections or only at those which have the highest error impact in the piping system, until a consistent model is achieved. In this manner, the sources of errors can be isolated and displayed.

Figure 5:
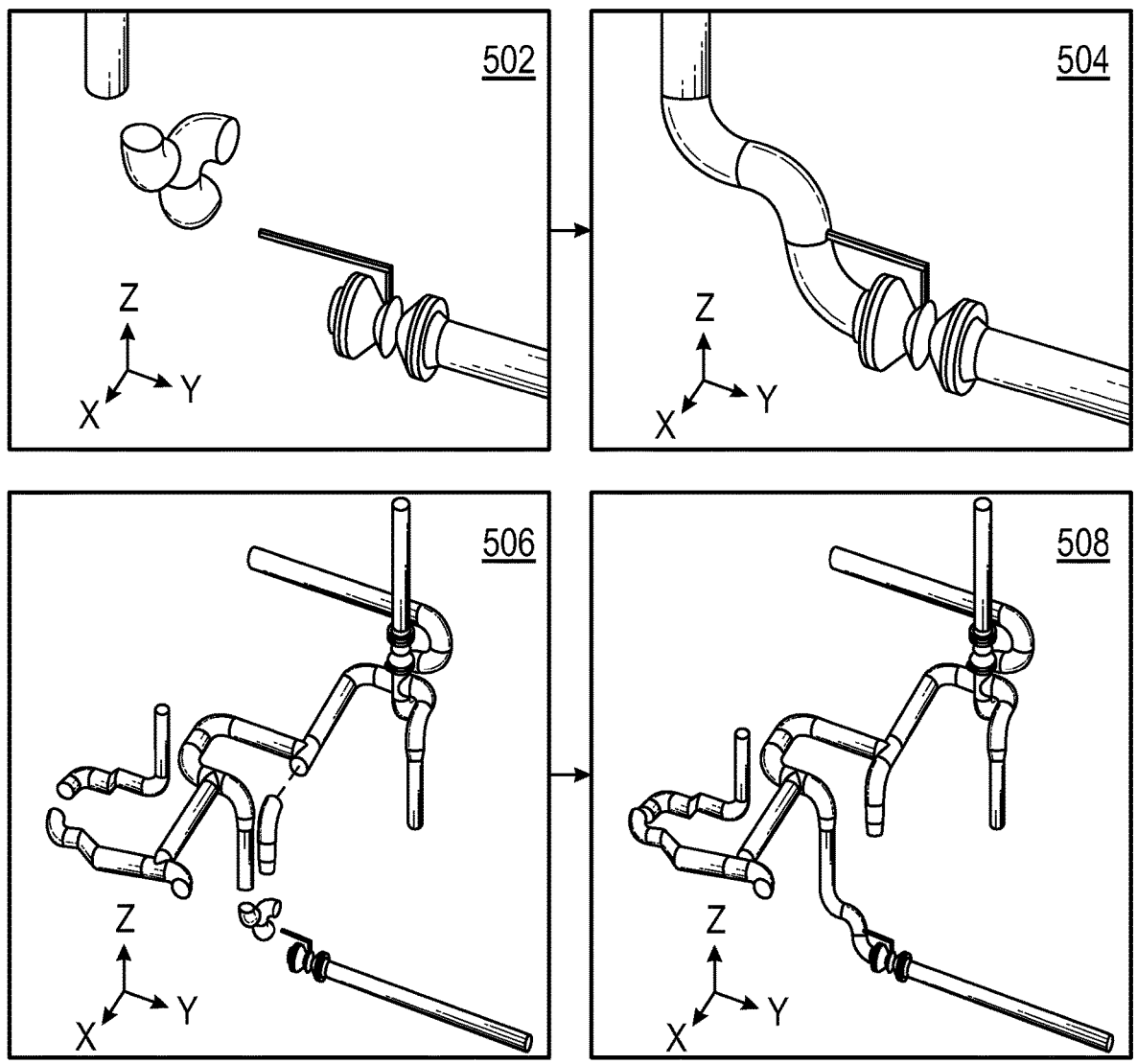
FIG. 5 depicts a complex piping system alignment that can be performed in accordance with one or more embodiments.

Turning now to FIG. 5, a complex piping system alignment 500 that can be performed using one or more embodiments described herein is generally shown. As shown in FIG. 5, point cloud based pipe model 502 can be transformed into aligned pipe model 504, and point clouds based pipe model 506 transformed into aligned pipe model 508.

Figure 6:
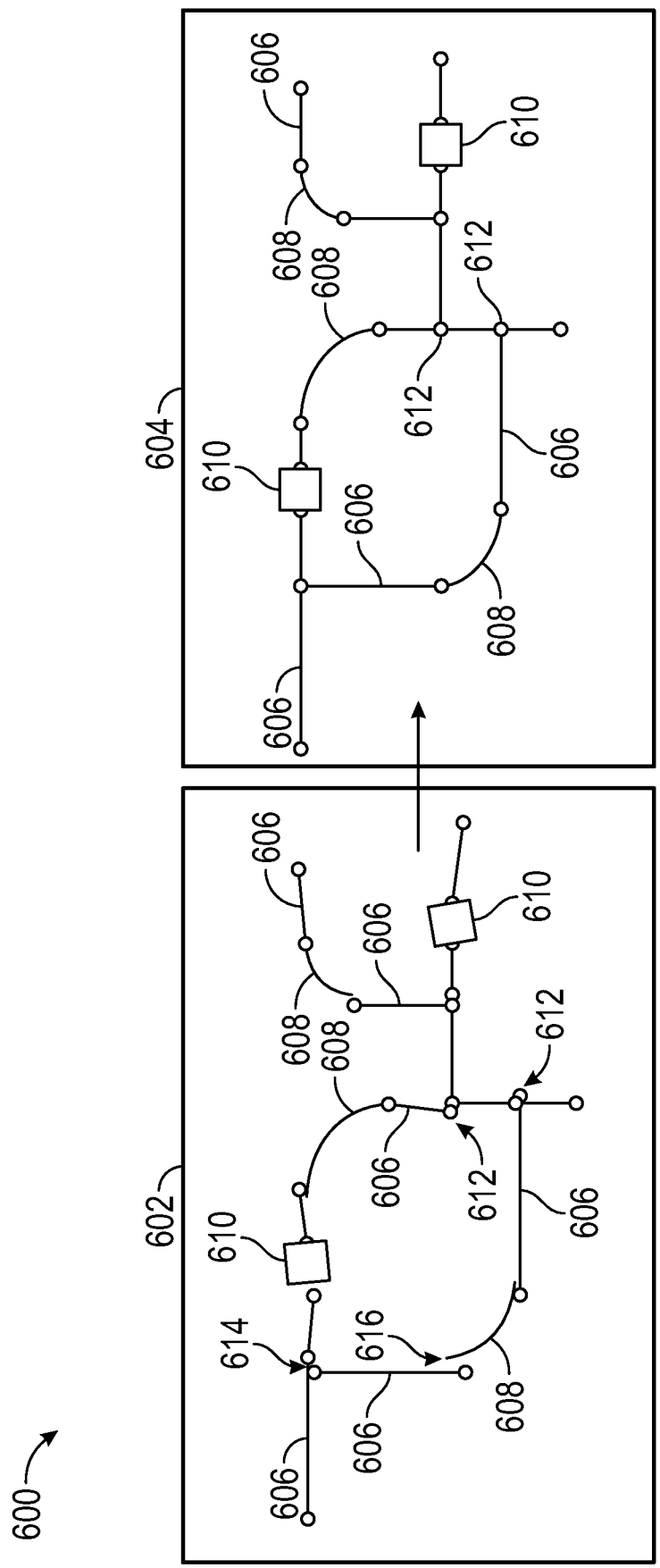
FIG. 6 depicts an example of a cloud based pipe model and its corresponding aligned pipe model in accordance with one or more embodiments.

Turning now to FIG. 6, an example of a system 600 having a cloud based pipe model 602 and its corresponding aligned pipe model 604 is generally shown in accordance with one or more embodiments. In this embodiment, the pipe model 602 is represented by pipes 606 and fixes, such as elbows 608, valves 610 and tee-fittings 612. In some instances, the ends of adjoining pipes 606 and fixes 608, 610, 612 are not aligned resulting in gaps 614 or displacements 616 between ends of adjacent components. In one or more embodiments, the process shown in FIG. 4 is applied to transform cloud based pipe model 602 into aligned pipe model 604.

It should be appreciated that while embodiments herein describe the processes with respect to piping systems, this is for exemplary purposes and the claimed invention should not be so limited. In other embodiments, the processes described herein can be used to create aligned models for any models built bases on a point cloud (e.g., from a laser tracker). Examples of types of models include, but are not limited to: building walls; piping systems; and steel construction. Accordingly, although a detailed example is described herein in reference to a piping system, the system described herein may be generally applicable to any number of point cloud models. More generally, one or more embodiments described herein can be used for the global optimization of networks of intelligent objects (e.g., digitally or electronically stored objects), with the global optimization taking into account all hard constraints between single intelligent objects while simultaneously reducing or minimizing the distance between the intelligent objects' surfaces and a digital or electronic representation of the network (e.g. a point cloud).

Figure 7:
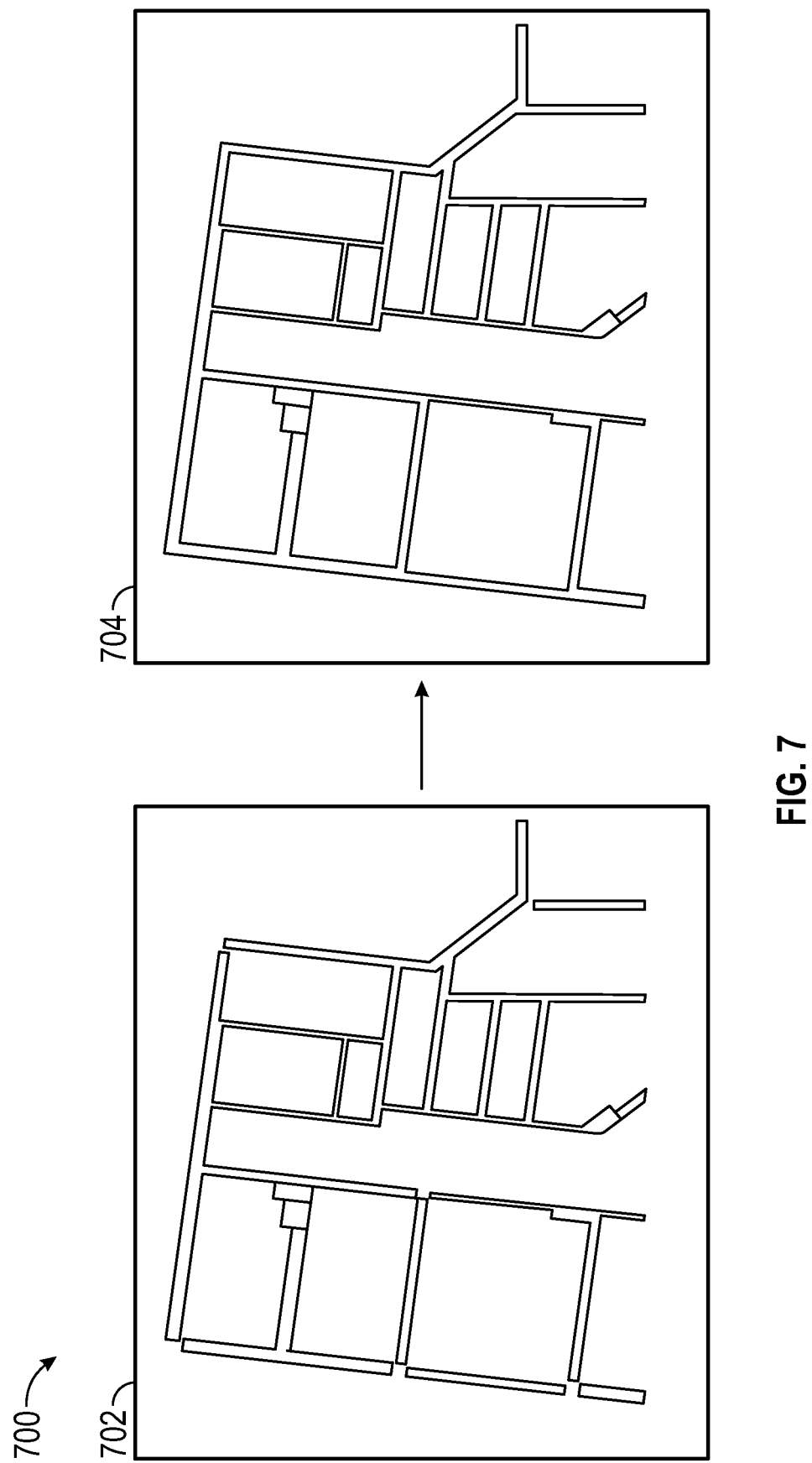
FIG. 7 depicts an example of a cloud based building wall model and its corresponding aligned building wall model in accordance with one more embodiments.

Turning now to FIG. 7, an example is provided of a model 700 generated from a point cloud of walls in a building. The model 700 as generated from the point cloud is represented as initial building wall model 702 (which includes gaps and displacements between ends of walls) and its corresponding aligned building wall model 704 is generally shown in accordance with one or more embodiments. In one or more embodiments, the process shown in FIG. 4 is applied to transform cloud based building wall model 702 into aligned building wall model 704. In embodiments that transform building wall models, constraints can include, but are not limited to: the walls being perpendicular; the walls being continuous or contiguously aligned, and the walls being trimmed/extended. In accordance with one or more embodiments, the walls are clustered globally to coordinate reference systems to provide reduced or minimal angle and movement deviations. The built in parts (door, windows, etc.) are moved together with the walls, but have no impact on the process in accordance with one or more embodiments.

In one or more embodiments, different domains are combined in the same building. For example, the piping/duct system might follow to the orientation of the built walls or vice versa.

Figure 8:
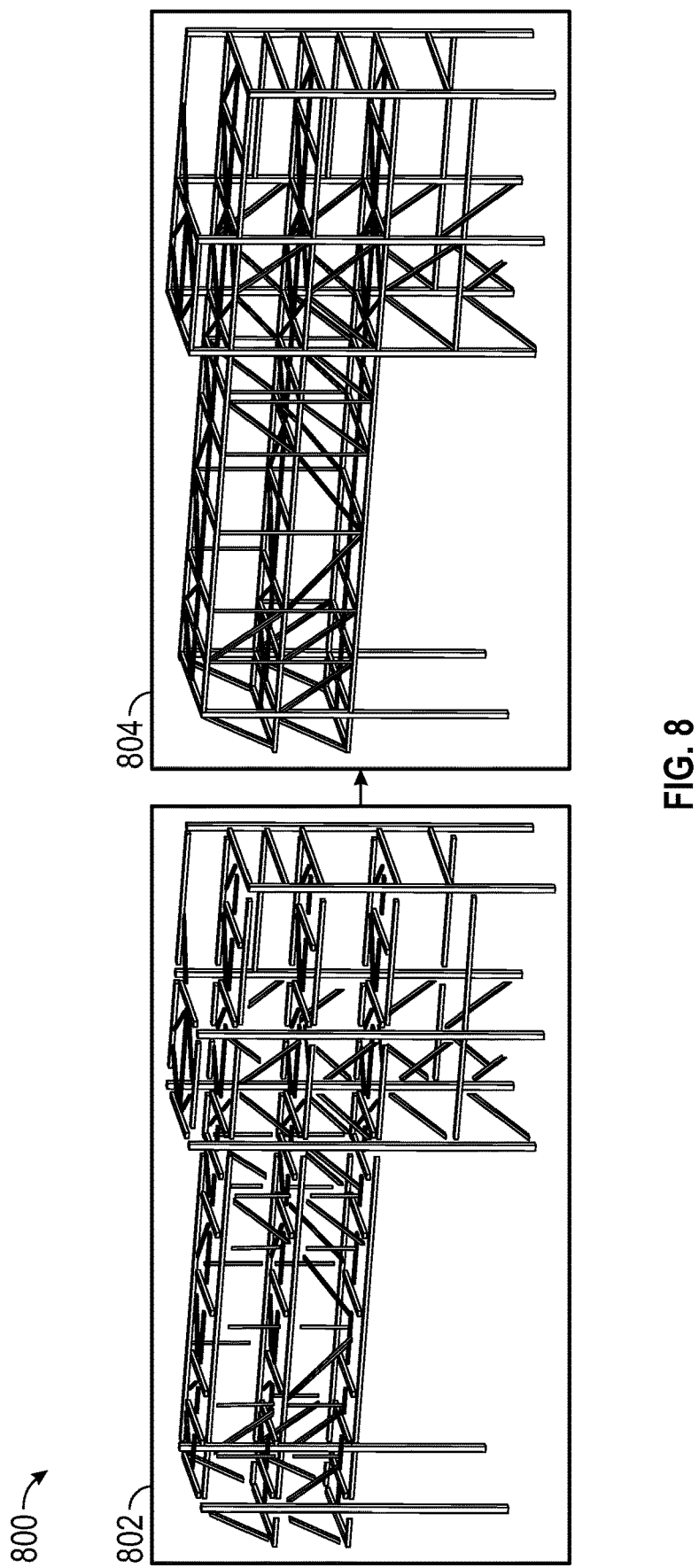
FIG. 8 depicts an example of a cloud based steel construction model and its corresponding aligned steel construction model in accordance with one more embodiments.

Turning now to FIG. 8, an example of a point cloud based steel construction model 800 representing the girders of a building is shown in accordance with one or more embodiments. The model 800 includes an initial construction model 802 and its corresponding aligned steel construction model 804 is generally shown in accordance with one or more embodiments. In one or more embodiments, the process shown in FIG. 4 is applied to transform cloud based steel construction model 802 into aligned construction model 804. In accordance with one or more embodiments, the steel beams are clustered globally to coordinate reference systems to provide reduced or minimal angle and movement deviations. The system axis (center line or top/bottom/edge axis line) may meet at a steel connection point with the other steel parts. The steel construction model domain can also be combined with parts or components from other domains.

Figure 9:
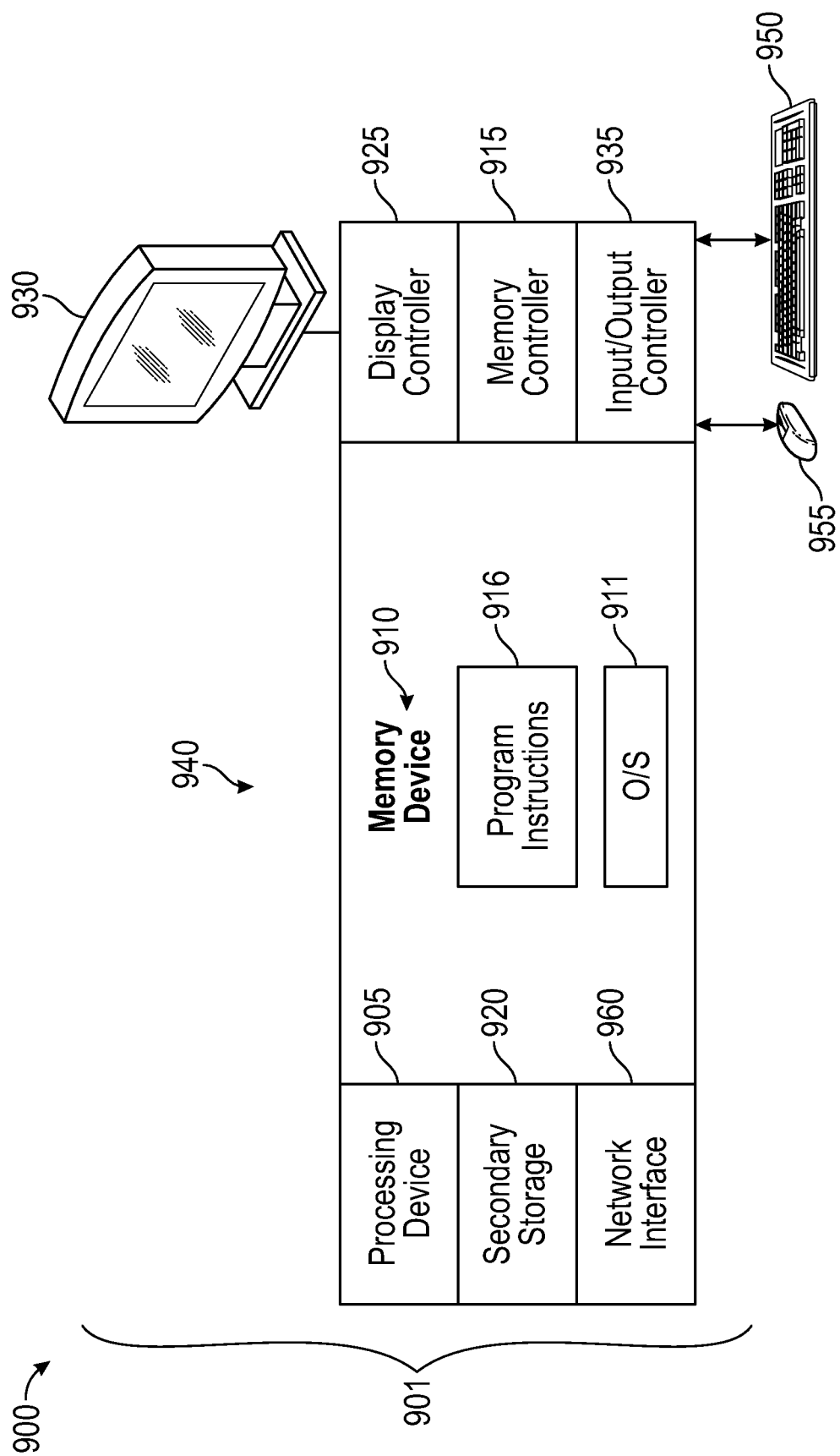
FIG. 9 depicts a block diagram of a system according to one or more embodiments.

Turning now to FIG. 9, a system 900 is depicted upon which one or more embodiments of a process for creating an aligned model from a point cloud model may be implemented. In an embodiment, the system 900 may be incorporated into the metrology device used to acquire the point cloud data. In one or more exemplary embodiments, in terms of hardware architecture, as shown in FIG. 9, the computer 901 includes a processing device 905 and a memory device 910 coupled to a memory controller 915 and an input/output controller 935. The input/output controller 935 can be, for example, but not limited to, one or more buses or other wired or wireless connections, as is known in the art. The input/output controller 935 may have additional elements, which are omitted for simplicity, such as controllers, buffers (caches), drivers, repeaters, and receivers, to enable communications. Further, the computer 901 may include address, control, and/or data connections to enable appropriate communications among the aforementioned components.

In one or more exemplary embodiments, a keyboard 950 and mouse 955 or similar devices can be coupled to the input/output controller 935. Alternatively, input may be received via a touch-sensitive or motion sensitive interface (not depicted). The computer 901 can further include a display controller 925 coupled to a display 930.

The processing device 905 is a hardware device for executing software, particularly software stored in secondary storage 920 or memory device 910. The processing device 905 can be any custom made or commercially available computer processor, a central processing unit (CPU), an auxiliary processor among several processors associated with the computer 901, a semiconductor-based microprocessor (in the form of a microchip or chip set), a macro-processor, or generally any device for executing instructions.

The memory device 910 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), flash memory, programmable read only memory (PROM), tape, compact disc read only memory (CD-ROM), flash drive, disk, hard disk drive, diskette, cartridge, cassette or the like, etc.). Moreover, the memory device 910 may incorporate electronic, magnetic, optical, and/or other types of storage media. Accordingly, the memory device 910 is an example of a tangible computer readable storage medium 940 upon which instructions executable by the processing device 905 may be embodied as a computer program product. The memory device 910 can have a distributed architecture, where various components are situated remote from one another, but can be accessed by the processing device 905.

The instructions in memory device 910 may include one or more separate programs, each of which comprises an ordered listing of executable instructions for implementing logical functions. In the example of FIG. 9, the instructions in the memory device 910 include a suitable operating system (OS) 911 and program instructions 916. The operating system 915 essentially controls the execution of other computer programs and provides scheduling, input-output control, file and data management, memory management, and communication control and related services. When the computer 901 is in operation, the processing device 905 is configured to execute instructions stored within the memory device 910, to communicate data to and from the memory device 910, and to generally control operations of the computer 901 pursuant to the instructions. Examples of program instructions 916 can include instructions to implement the processing described herein in reference to FIGS. 1-8.

The computer 901 of FIG. 9 also includes a network interface 960 that can establish communication channels with one or more other computer systems via one or more network links. The network interface 960 can support wired and/or wireless communication protocols known in the art. For example, when embodied in a user system, the network interface 960 can establish communication channels with an application server.

It will be appreciated that aspects of the present invention may be embodied as a system, method, or computer program product and may take the form of a hardware embodiment, a software embodiment (including firmware, resident software, micro-code, etc.), or a combination thereof. Furthermore, aspects of the present invention may take the form of a computer program product embodied in one or more computer readable medium(s) having computer readable program code embodied thereon.

One or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In one aspect, the computer readable storage medium may be a tangible medium containing or storing a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The computer readable medium may contain program code embodied thereon, which may be transmitted using any appropriate medium, including but not limited to wireless, wireline, optical fiber cable, RF, etc., or any suitable combination of the foregoing. In addition, computer program code for carrying out operations for implementing aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server.

It will be appreciated that aspects of the present invention are described herein with reference to flowchart illustrations and/or block diagrams of methods, apparatus (systems) and computer program products according to embodiments of the invention. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed general purpose computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

What is claimed is:

1. A system, comprising
a processing device; and
a memory device in communication with the processing device, the memory device storing instructions that when executed by the processing device result in:
receiving an electronic representation of a network of intelligent objects, the network including a plurality of intelligent objects and a plurality of gaps greater than a threshold between at least three of the intelligent objects;
creating an aligned model of the network based at least in part on quaternion calculus, wherein all gaps in the aligned model of the network are less than the threshold, the creating comprising:
optimizing a first plurality of the intelligent objects towards an axis of a second plurality of intelligent objects, wherein displacements between the intelligent objects are represented as dual unit quaternions and the optimizing comprises adding dual vectors built based at least in part on the dual unit quaternions;
aligning the second plurality of intelligent objects towards the first plurality of intelligent objects, wherein the aligning comprises normalizing results of the adding dual vectors; and
continuing to iteratively perform the optimizing and the aligning until a stopping condition is met; and
outputting the aligned model of the network.

2. The system of claim 1, wherein the electronic representation is created by a three-dimensional (3D) metrology device.

3. The system of claim 2, wherein the 3D metrology device is a laser scanner.

4. The system of claim 1, wherein the electronic representation includes a point cloud model.

5. The system of claim 1, wherein the network of intelligent objects is a piping system.

6. The system of claim 1, wherein the creating is further based at least in part on a minimal displacement approach that minimizes movement of the first and second plurality of intelligent objects.

7. The system of claim 1, wherein an amount of movement of the first and second plurality of intelligent objects is limited by a movement threshold in each iteration of the optimizing and aligning.

8. The system of claim 1, wherein a size of an intelligent object is altered by the creating.

9. The system of claim 1, wherein a position of an intelligent object is fixed during the creating.

10. The system of claim 1, wherein the stopping condition includes a maximum deviation error at connection points between the first and second plurality of intelligent objects.

11. The system of claim 1, wherein the stopping condition includes a number of iterations of the optimizing and the aligning.

12. The system of claim 1, wherein the first and second plurality of intelligent objects are contiguous in the aligned model.

13. The system of claim 1, wherein the aligned model is output to a design package for performing isometrics and simulations.

14. A method comprising:
receiving an electronic representation of a network of intelligent objects, the network including a plurality of intelligent objects and a plurality of gaps greater than a threshold between at least three of the intelligent objects;
creating an aligned model of the network based at least in part on quaternion calculus, wherein all gaps in the aligned model of the network are less than the threshold, the creating comprising:
optimizing a first plurality of the intelligent objects towards an axis of a second plurality of intelligent objects, wherein displacements between the intelligent objects are represented as dual unit quaternions and the optimizing comprises adding dual vectors built based at least in part on the dual unit quaternions;

aligning the second plurality of intelligent objects towards the first plurality of intelligent objects, wherein the aligning comprises normalizing results of the adding dual vectors; and continuing to iteratively perform the optimizing and the aligning until a stopping condition is met; and outputting the aligned model of the network.

15. The method of claim 14, wherein the network of intelligent objects is a piping system.

16. The method of claim 14, wherein the creating is further based at least in part on a minimal displacement approach that minimizes movement of the first and second plurality of intelligent objects.

17. The method of claim 14, wherein an amount of movement of the first and second plurality of intelligent objects is limited by a movement threshold in each iteration of the optimizing and aligning.

18. The method of claim 14, wherein at least one of:
a size of an intelligent object is altered by the creating; and
a position of an intelligent object is fixed during the creating.

19. The method of claim 14, wherein the stopping condition includes at least one of:
a maximum deviation error at connection points between the first and second plurality of intelligent objects; and
a number of iterations of the optimizing and the aligning.

20. The method of claim 14, wherein the first and second plurality of intelligent objects are contiguous in the aligned model.

21. A computer program product comprising a computer readable storage medium having program instructions embodied therewith, the program instructions executable by a processor to cause the processor to perform operations comprising:

receiving an electronic representation of a network of intelligent objects, the network including a plurality of intelligent objects and a plurality of gaps greater than a threshold between at least three of the intelligent objects;

creating an aligned model of the network based at least in part on quaternion calculus, wherein all gaps in the aligned model of the network are less than the threshold, the creating comprising:

optimizing a first plurality of the intelligent objects towards an axis of a second plurality of intelligent objects, wherein displacements between the intelligent objects are represented as dual unit quaternions and the optimizing comprises adding dual vectors built based at least in part on the dual unit quaternions;

aligning the second plurality of intelligent objects towards the first plurality of intelligent objects, wherein the aligning comprises normalizing results of the adding dual vectors; and continuing to iteratively perform the optimizing and the aligning until a stopping condition is met; and outputting the aligned model of the network.

* * * * *